US009485255B1

(12) United States Patent
Avital

(10) Patent No.: US 9,485,255 B1
(45) Date of Patent: Nov. 1, 2016

(54) AUTHENTICATION USING REMOTE DEVICE LOCKING

(71) Applicant: EMC Corporation, Hopkinton, MA (US)

(72) Inventor: Aviv Avital, Be'er Sheva (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 13 days.

(21) Appl. No.: 14/669,554

(22) Filed: Mar. 26, 2015

(51) Int. Cl.
H04L 29/06 (2006.01)

(52) U.S. Cl.
CPC ............. *H04L 63/10* (2013.01); *H04L 63/123* (2013.01)

(58) Field of Classification Search
CPC ........ G06F 21/30; G06F 21/60; G06F 21/62; G06F 2221/2117; G06F 2221/2137; H04L 9/00; H04L 9/32; H04L 9/3226; H04L 63/08; H04L 63/083; H04L 63/10; H04L 63/12; H04L 63/123
See application file for complete search history.

(56) References Cited

U.S. PATENT DOCUMENTS

| 6,542,730 | B1* | 4/2003 | Hosain | H04M 1/67 455/410 |
| 8,091,120 | B2 | 1/2012 | Perrella et al. | |
| 8,621,586 | B1 | 12/2013 | Peer et al. | |
| 8,646,060 | B1 | 2/2014 | Ben Ayed | |
| 8,795,388 | B2* | 8/2014 | Aissi | G06F 21/6209 726/35 |
| 8,816,816 | B2* | 8/2014 | Ciervo | G06F 1/1632 340/4.34 |
| 8,832,790 | B1 | 9/2014 | Villa et al. | |
| 8,856,923 | B1 | 10/2014 | Kolman et al. | |
| 8,875,267 | B1 | 10/2014 | Kolman et al. | |
| 8,973,096 | B1 | 3/2015 | Villa et al. | |
| 9,078,129 | B1 | 7/2015 | Dotan et al. | |
| 2005/0221800 | A1* | 10/2005 | Jackson | H04M 1/72552 455/411 |
| 2009/0017790 | A1* | 1/2009 | Thalapaneni | H04L 29/12047 455/410 |
| 2009/0132813 | A1* | 5/2009 | Schibuk | G06Q 20/223 713/158 |
| 2009/0241172 | A1* | 9/2009 | Sennett | G06F 21/88 726/4 |
| 2014/0057597 | A1* | 2/2014 | Velusamy | H04W 12/08 455/411 |
| 2014/0242949 | A1* | 8/2014 | Burch | H04W 12/06 455/411 |

(Continued)

OTHER PUBLICATIONS

Ika Bar-Menachem, et al.; "Knowledge Based Authentication Using Mobile Devices"; U.S. Appl. No. 14/098,269, filed Dec. 5, 2013.

(Continued)

Primary Examiner — Eric W Shepperd
(74) Attorney, Agent, or Firm — BainwoodHuang

(57) ABSTRACT

A method includes (a) receiving, by the authentication server device, an authentication request from a requesting device in the name of a particular user, the requesting device being a mobile computer seeking access to the protected resource in the name of the particular user, (b) in response to receiving the authentication request, verifying that the requesting device is an enrolled device, the enrolled device being a mobile computer previously assigned to the particular user, (c) in response to verifying that the requesting device is equivalent to the enrolled device, remotely locking, by the authentication server device, the enrolled device, (d) receiving confirmation, by the authentication server device, that the enrolled device has been unlocked within a timeout period, and (e) in response to the authentication server device receiving confirmation that the enrolled device has been unlocked within the timeout period, providing the requesting device with access to the protected resource.

15 Claims, 6 Drawing Sheets

(56) References Cited

U.S. PATENT DOCUMENTS

| | | | | |
|---|---|---|---|---|
| 2014/0330990 | A1* | 11/2014 | Lang | G06F 9/4555 710/14 |
| 2014/0331285 | A1* | 11/2014 | Desai | H04L 63/08 726/4 |
| 2015/0146944 | A1* | 5/2015 | Pi | H04L 63/0861 382/124 |
| 2015/0257004 | A1* | 9/2015 | Shanmugam | H04L 63/0853 455/411 |
| 2015/0278653 | A1* | 10/2015 | Fujimoto | G06F 3/121 358/1.14 |
| 2016/0140545 | A1* | 5/2016 | Flurscheim | G06Q 20/3821 705/76 |

OTHER PUBLICATIONS

Aviv Avital, et al.; "Authenticating a User While the User Operates a Client Apparatus and Possesses an Electronic Card"; U.S. Appl. No. 14/561,640, filed Dec. 5, 2014.

Tamar Wisemon, et al.; "Detecting Mobile Device Emulation"; U.S. Appl. No. 14/565,739, filed Dec. 10, 2014.

Aviv Avital; "Authentication Using Facial Recognition", U.S. Appl. No. 14/674,347, filed Mar. 31, 2015.

Bodo Moller, et al.; "This Poodle Bites: Exploiting The SSL 3.0 Fallback"; <https://www.openssl.org/~bodo/ssl-poodle.pdf> Sep. 2014, 4 pages.

"The Heartbleed Bug"; <http://heartbleed.com> Apr. 2014, 7 pages.

* cited by examiner

AUTHENTICATION USING REMOTE DEVICE LOCKING

BACKGROUND

Users often desire to sign into remote servers (e.g., to access web mail or online banking). Typically authentication is performed using a password or a token in order to ensure the user's identity. In some systems, step-up authentication may be used in certain high-risk situations. This step-up authentication typically involves the user sending back a password, a token, or an answer to a question.

SUMMARY

Unfortunately, the above-described conventional systems suffer from deficiencies. For example, since these conventional systems rely on sending something the user knows for authentication, they are susceptible to eavesdropping. Thus, even if the authentication is encrypted, an attacker may be able to learn the user's username, token, or answers to various questions.

Thus, it would be desirable to provide a remote authentication technique for mobile devices that does not rely solely on sending something the user knows. Rather, it would be desirable to rely on a combination of something the user has with something the user knows, without revealing the secret outside the mobile device.

This may be accomplished by having an authentication server remotely lock a mobile device that is registered to a particular user and only permit access once that device is unlocked by the user. Even if an attacker finds or steals the user's device, and even if the device has been found in an unlocked state, the attacker will not be able to unlock the device once it is remotely locked, thereby preventing access. This locking procedure may be done as a step-up form of authentication.

One embodiment of the improved techniques is directed to a method performed by an authentication server device of providing access to a protected resource. The method includes (a) receiving, by the authentication server device, an authentication request from a requesting device in the name of a particular user, the requesting device being a mobile computing device seeking access to the protected resource in the name of the particular user, (b) in response to receiving the authentication request, verifying that the requesting device is an enrolled device, the enrolled device being a mobile computing device previously assigned to the particular user, (c) in response to verifying that the requesting device is equivalent to the enrolled device, remotely locking, by the authentication server device, the enrolled device, (d) receiving confirmation, by the authentication server device, that the enrolled device has been unlocked within a timeout period, and (e) in response to the authentication server device receiving confirmation that the enrolled device has been unlocked within the timeout period, providing the requesting device with access to the protected resource. Other embodiments are directed to a system, a computerized apparatus, and a computer program product for performing methods of providing access to a protected resource similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for providing a mobile device with access to a protected resource across a network that do not rely solely on sending something the user knows. An authentication server remotely locks a mobile device that is registered to a particular user and only permits access once that device is unlocked by the user. Even if an attacker finds or steals the user's device, and even if the device has been found in an unlocked state, the attacker will not be able to unlock the device once it is remotely locked, thereby preventing access. This locking procedure may be done as a step-up form of authentication.

Figure 1:
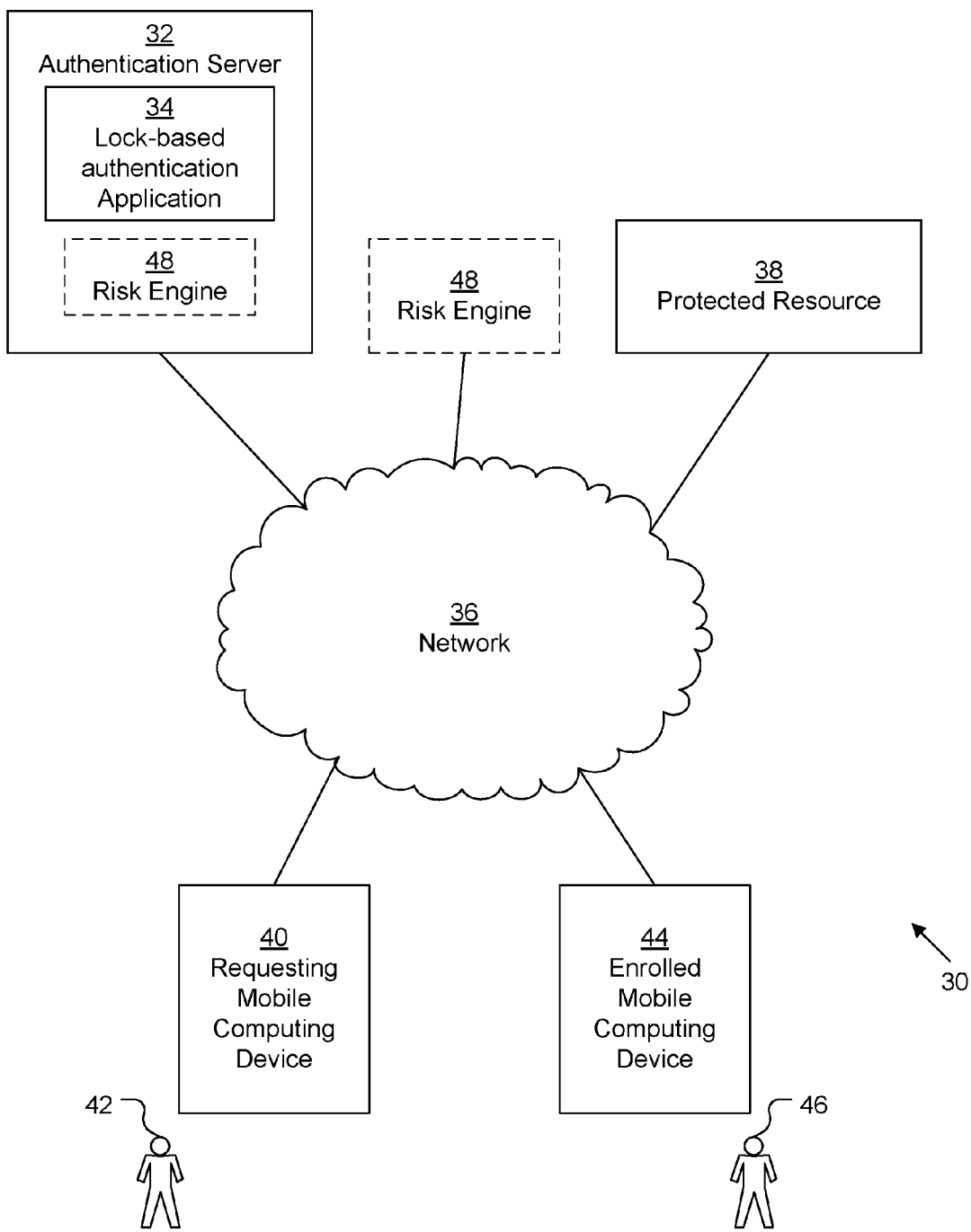
FIG. 1 is a block diagram depicting an example system for use in connection with various embodiments.

FIG. 1 depicts an example system 30 in which improved techniques hereof may be practiced. System 30 includes an authentication server 32 running a lock-based authentication application 34. Authentication server 32 connects, over a network 36, to a protected resource 38, and one or more mobile computing devices 40, 44. In some embodiments, a risk engine 48 also connects to network 36 as a hardware component. In yet other embodiments, the risk engine 48 is a software component running on the authentication server 32.

Network 36 may be any kind of network, such as, for example, a local area network, a wide area network, the Internet, a storage area network, a fabric of interconnected hubs and switches, etc. In some embodiments, in lieu of a network, direct point-to-point connections may be used.

Authentication server 32 may be any kind of computing device capable of functioning in a server capacity, such as, for example, a personal computer, a workstation, a server, an enterprise server, etc.

Protected resource 38 may be any kind of digital resource that a user may wish to access over network 36 for which access control is desired. For example, the protected resource 38 may be a document, a website (e.g., web mail, online banking, etc.), a database, a server (e.g., a Unix machine), etc. Although not depicted explicitly, protected resource 38 may reside on a computing device or a server connected to network 36 (e.g., in the cases in which the protected resource 38 is a document, a website, or a database).

Mobile computing devices 40, 44 may be any kind of computing devices that are mobile, such as, for example, a smart phone, a tablet computer, a handheld computer, a laptop computer, a smart watch, a wearable computer, etc. One of the mobile computing devices 40, 44 is an enrolled mobile computing device 44, which is operated by a registered user 46 who is authorized to access the protected resource 38. In some embodiments, the user 46 may register the enrolled mobile computing device 44 with the authentication server 32 as his or her personal mobile computing device (e.g., a cell phone or tablet used primarily or exclusively by the registered user 46). In other embodiments, the user 46 and his or her enrolled mobile computing device 44 may become registered with the authentication server 32 in some other way. Either way, the registered user 46 is able to unlock the enrolled mobile computing device 44 by inputting a user-specific secret unlock code (e.g., a passcode, PIN, or a pattern) generally not known to others.

One of the mobile computing devices 40, 44 is a requesting mobile computing device 40, which is operated by a requesting user 42 who desires to access the protected resource 38. In some cases, the requesting user 42 is a registered user 46 and the requesting mobile computing device 40 is an enrolled mobile computing device 44. However, in other cases, the requesting user 42 is not a registered user 46, but rather a fraudster. In some of these cases, the requesting mobile computing device 40 is not an enrolled mobile computing device 44, but rather another mobile computing device operated by the fraudster.

Lock-based authentication application 34 executes on the authentication server 32 in communication with the requesting mobile computing device 40 and the enrolled mobile computing device 44 (which may or may not be one and the same, depending on the use case) in order to authenticate the requesting user 42 as the registered user 46. Lock-based authentication application 34 does this by, upon determining that the requesting mobile computing device 40 and the enrolled mobile computing device 44 are the same, remotely locking the requesting mobile computing device 40 and only permitting access if the user 42 is able to successfully unlock the device 40 within a timeout period (e.g., within 1 minute or within 5 attempts).

In some embodiments, lock-based authentication application 34 is only invoked in high-risk cases. This is accomplished by the requesting user 42 first using a preliminary authentication technique to log in (e.g., using a username and password). Certain information associated with the preliminary authentication is sent to the risk engine 48 (which may operate on the authentication server 32 or it may be a separate component on the network 36), which then returns a risk score, based on how risky the transaction appears to be (e.g., based on previous usage patterns and on how important the transaction is). Only if the risk score is above a certain threshold, indicating a very risky transaction, does the lock-based authentication application 34 perform lock-based authentication.

Figure 2:
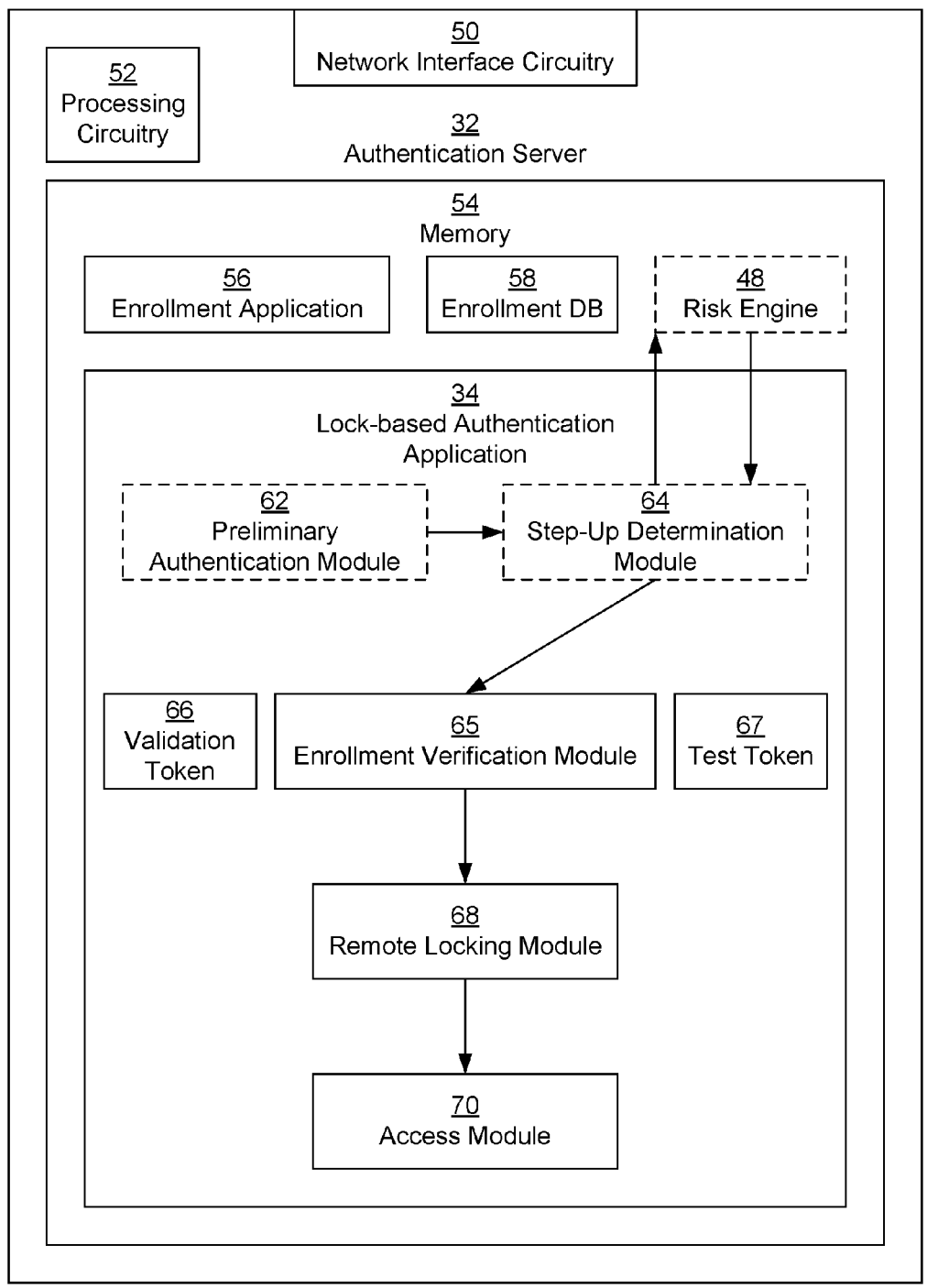
FIG. 2 is a block diagram depicting an example apparatus according to various embodiments.

FIG. 2 depicts an example authentication server 32 in further detail. Authentication server 32 includes network interface circuitry 50, processing circuitry 52, and memory 54.

Network interface circuitry 50 may include one or more Ethernet cards, cellular modems, Wireless Fidelity (WiFi) wireless networking adapters, any other devices for connecting to a network (e.g., network 36), or some combination thereof. Processing circuitry 52 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 54 may be any kind of digital system memory, such as, for example, random access memory (RAM). Memory 54 stores an executing operating system (OS, not depicted) and one or more applications (e.g., enrollment application 56, risk engine 48, and lock-based authentication application 34) executing on processing circuitry 52 as well as data used by those applications (e.g., enrollment database (DB) 58). Memory 54 also stores, during execution of lock-based authentication application 34, various tokens 66, 67.

In some embodiments, memory 54 may also include a persistent storage portion (not depicted). Persistent storage may be made up of one or more persistent storage devices, such as, for example, hard disk drives, solid-state storage devices, flash drives, etc. Persistent storage is configured to store programs and data even while the authentication server 32 is powered off. The OS (e.g., Linux, UNIX, Windows, or a similar operating system) and the applications (e.g., enrollment application 56, risk engine 48, and lock-based authentication application 34) are typically stored in persistent storage so that they may be loaded into memory 54 from persistent storage upon a system restart. These applications, when stored in non-transient form either in the volatile portion of memory 54 or in persistent storage, form a computer program product. The processing circuitry 52 running one or more of these applications thus forms a specialized circuit constructed and arranged to carry out the various processes described herein. In some embodiments, enrollment DB 58 is stored primarily within persistent storage rather than within the volatile portion of memory 54, although portions thereof may be cached in the volatile portion of memory 54 temporarily.

Enrollment application 56 operates to register registered users 46 in connection with their respective enrolled mobile computing devices 44 in enrollment DB 58. Thus, enrollment application 56 may store an association between a user identifier (e.g., a username) of the registered user 46 and a device identifier (e.g., an International Mobile Station Equipment Identity, a MAC address, or a telephone number) of the enrolled device 44. In some embodiments, enrollment DB 58 may be stored within Risk Engine 48 or on another device.

In some embodiments, lock-based authentication application 34 may include various modules, as depicted in FIG. 2, although, in other embodiments, lock-based authentication application 34 may not be divided into modules at all, or it may include a different division of modules.

In embodiments in which the lock-based authentication is done for step-up purposes, lock-based authentication application 34 includes a preliminary authentication module 62 and a step-up determination module 64. In some embodiments in which lock-based authentication is not done for step-up purposes, lock-based authentication application 34 may also include preliminary authentication module 62 in order to perform two-factor authentication. Preliminary authentication module 62 operates to communicate with the requesting mobile computing device 40 to obtain a username and password (or other login information) from the requesting user 42. Step-up determination module 64 communicates with risk engine 48 to obtain a risk score and then determines, based on the obtained risk score, whether to step-up the authentication (e.g., if the risk score exceeds a predetermined threshold). If step-up determination module 64 makes an affirmative decision to step-up the authentication, the enrollment verification module 65 is invoked.

Enrollment verification module 65 determines whether or not the requesting mobile computing device 40 is the same as the enrolled mobile computing device 44. In some embodiments, enrollment verification module 65 does this by generating a validation token 66 (which is a one-time-use or short-lived token), sending it to the requesting mobile computing device 40, and then requesting that the enrolled mobile computing device 44 return that token. Enrollment verification module 65 then receives back a test token 67 from the enrolled mobile computing device 44 (or possibly no token is received at all), which it can compare with the validation token 66. If the comparison succeeds, the enrollment verification module 65 has verified that the requesting mobile computing device 40 is the same as the enrolled mobile computing device 44. In some embodiments, instead of sending the validation token 66 to the requesting mobile computing device 40 and receiving the test token from the enrolled mobile computing device 44, the opposite may be done. However, it is preferable to send the validation token 66 to the requesting mobile computing device 40 in order to avoid a denial of service attack caused by a fraudster repeatedly requesting access from a fraudulent requesting mobile computing device 40, which could result in the memory of the enrolled mobile computing device 44 being filled with validation tokens 66 if the opposite were done.

Remote locking module 68 operates to remotely lock the requesting mobile device 40 (which has been verified by the enrollment verification module 65 to be the same as the enrolled mobile device 44) over the network 36 and then to await notification that the requesting mobile device 40 has been successfully unlocked. This may be accomplished according to various means. For example, there are APIs available for both Apple/iOS and Google/Android based smart phones that allow devices to be remotely locked from within a user's account.

Access module 70 operates to grant access to the requesting mobile device 40 once the remote locking module has verified that the requesting mobile device 40 has been successfully unlocked.

Figure 3:
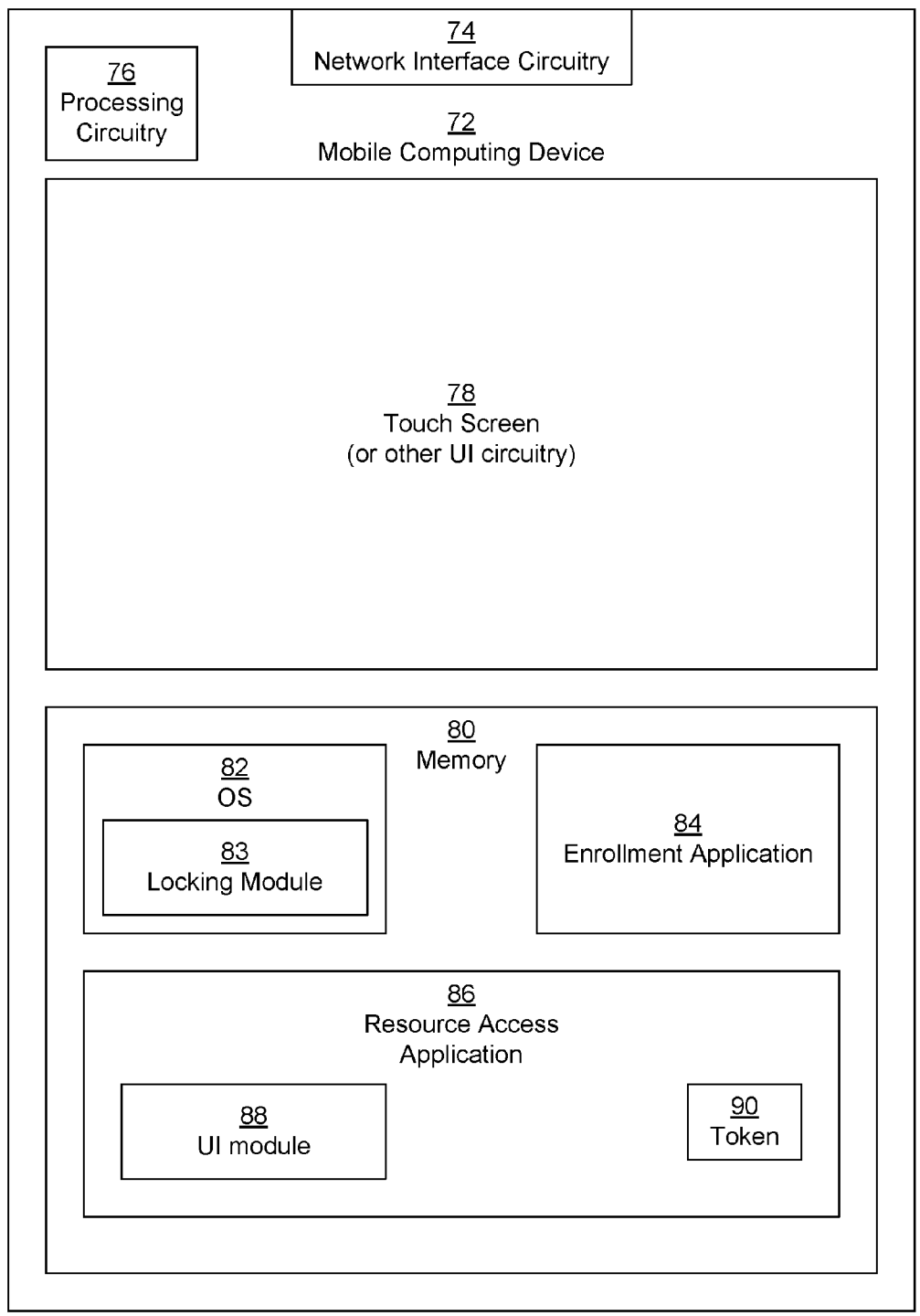
FIG. 3 is a block diagram depicting another example apparatus according to various embodiments.

FIG. 3 depicts an example mobile computing device 72. Mobile computing device 72 may be any kind of computing device that is mobile, such as, for example, a smart phone, a tablet computer, a handheld computer, a laptop computer, a smart watch, a wearable computer, etc. The requesting mobile computing device 40 and the enrolled mobile computing device 44 are both configured as typical mobile computing devices 72. Mobile computing device 72 includes network interface circuitry 74, processing circuitry 76, touch screen (or other user interface circuitry) 78, and memory 80.

Network interface circuitry 74 may include one or more Ethernet cards, cellular modems, Wireless Fidelity (WiFi) wireless networking adapters, any other devices for connecting to a network (e.g., network 36), or some combination thereof. Processing circuitry 76 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Touch screen 78 is a touch-sensitive display screen embedded within the mobile computing device 72 together with circuitry for displaying information on the display screen and circuitry for receiving touch commands from the user 42, 46. In some embodiments, the touch screen 78 may be external to the mobile computing device 72. In yet other embodiments, in place of (or in addition to) touch screen 78 is user interface circuitry that presents information to the user 42, 46 (e.g., a display screen, a speaker, a printer, etc.) and allows the user 42, 46 to input information (e.g., a mouse, trackpad, tracking stick, keyboard, microphone, biometric sensor, etc.).

Memory 80 may be any kind of digital system memory, such as, for example, random access memory (RAM). Memory 80 stores an executing OS 82 and one or more applications (e.g., enrollment application 84 and resource access application 86) executing on processing circuitry 76 as well as data used by those applications (e.g., token 90).

In some embodiments, memory 80 may also include a persistent storage portion (not depicted). Persistent storage may be made up of one or more persistent storage devices, such as, for example, hard disk drives, solid-state storage devices, flash drives, etc. Persistent storage is configured to store programs and data even while the mobile computing device 72 is powered off. The OS 82 (e.g., Linux, UNIX, Windows, Android, iOS, or a similar operating system) and the applications are typically stored in persistent storage so that they may be loaded into memory 80 from persistent storage upon a system restart. These applications, when stored in non-transient form either in the volatile portion of memory 80 or in persistent storage, form a computer program product. The processing circuitry 76 running one or more of these applications thus forms a specialized circuit constructed and arranged to carry out the various processes described herein.

OS 82 includes a locking module 83, which is responsible for locking the mobile computing device 72 and unlocking it in response to the user 42, 46 entering the proper code. When enabled by a user, locking module 82 typically locks the mobile computing device 72 after a set amount of idle time (e.g., in the in range of 1 to 15 minutes). Locking module 83 also locks the device in response to a command from an application running on the mobile computing device 72 or in response to a remote command (e.g., from remote locking module 68 operating on authentication server 32). When the mobile computing device 72 is locked, the user 42, 46 is typically not able to interface with the mobile computing device 72 except to enter in the unlock code (although, in some embodiments, certain information such as the time and a brief summary of recent messages may be displayed even when the mobile computing device 72 is locked). The unlock code may be any kind of code usable to unlock a mobile device, such as, for example, a text-based password, a graphical pattern (e.g., a swiping pattern), a passcode, biometric information, etc.

Enrollment application 84 operates to allow a user 46 to register the mobile computing device 72 with the authentication server 32 as the enrolled mobile computing device 44 associated with the account of that user 46.

Resource access application 86, which includes a user interface module 88, is run by the user 42 of the requesting mobile computing device 40 to access protected resource 38. Resource access application 86 communicates with authentication server 32 in order to obtain access for the user 42, as described below. Resource access application 86 may also run on the enrolled mobile computing device 44. In some embodiments, resource access application 86 receives a token 90 from the authentication server 32 and later sends the token 90 back to the authentication server 32.

Figure 4:
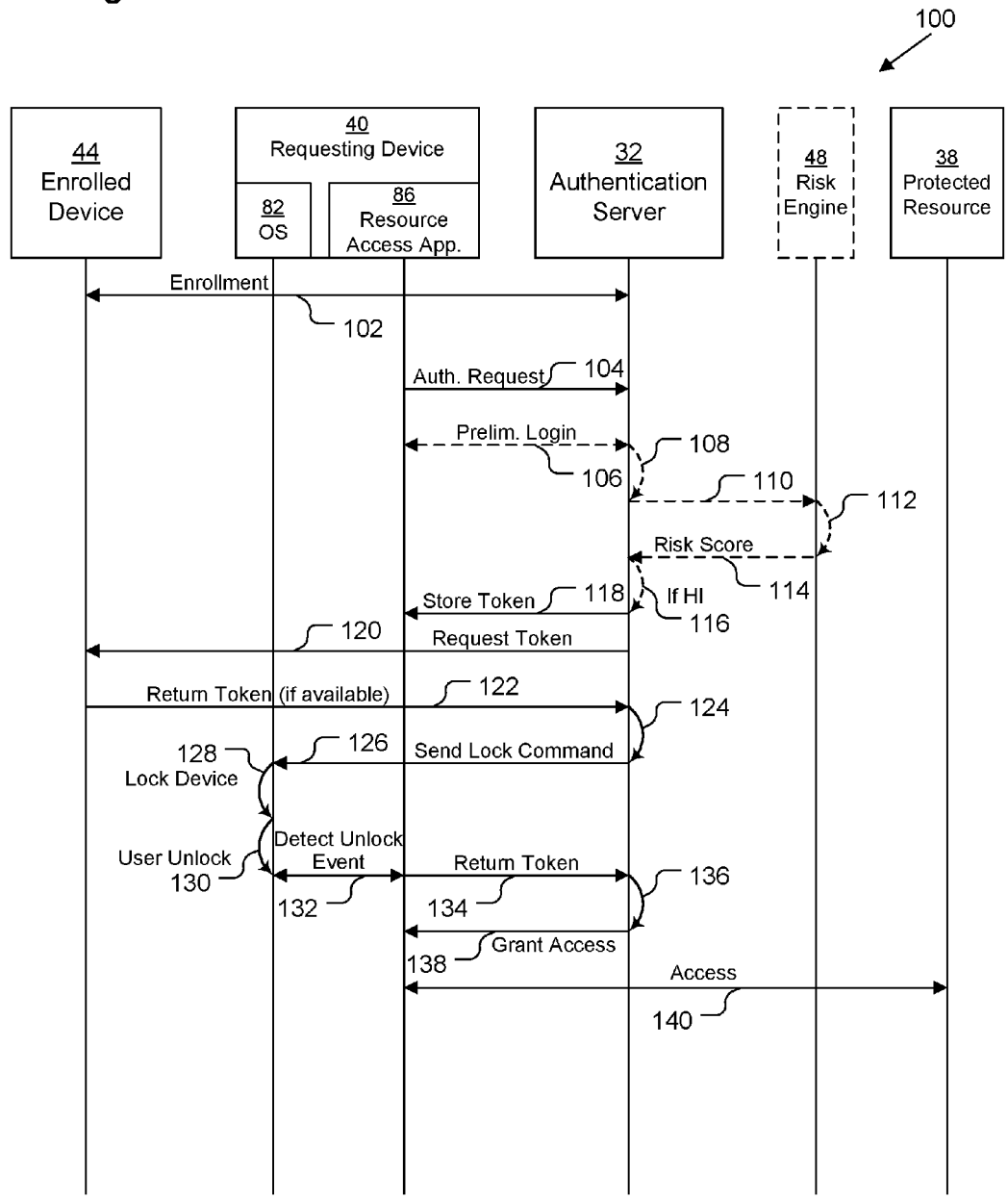
FIG. 4 is a sequence diagram depicting an example method according to various embodiments.

FIG. 4 is a sequence diagram depicting an example method 100 performed by the system 30 according to various embodiments to allow or deny a user 42 to access protected resource 38. It should be understood that any time a piece of software, such as, for example, lock-based authentication application 34, risk engine 48, enrollment application 56, OS 82, enrollment application 84, resource access application, etc., is described as performing a method, process, step, or function, in actuality what is meant is that a computing device (e.g., authentication server 32, requesting mobile computing device 40, enrolled mobile computing device 44, mobile computing device 72, etc.) on which that piece of software is running performs the method, process, step, or function when executing that piece of software on its processor (e.g., processing circuitry 52, 76). It should be understood that, within FIG. 4, steps 106-116 are dashed because they may be ancillary or optional to method 100.

Preliminarily, in step 102, enrolled device 44 registers with the authentication server 32. This allows enrollment DB 58 to store an identifier of the enrolled device 44 in association with a username of the registered user 46. It should be understood that, in some embodiments, registration step 102 may be performed by one or more other entities. For example, instead of the registered user 46 operating the enrollment application 84 on the enrolled device 44 to communicate with the enrollment application operating on the authentication server 32, a system administrator may instead update the enrollment DB 58, which may or may not be stored on the authentication server 32.

When a user 42 of the requesting device 40 wishes to access the protected resource 38, the user 42 operates the resource access application 86 to send authentication request 104 to the authentication server 32.

In some embodiments, a preliminary login procedure 106 is performed, during which the user 42 enters various information (e.g., username and password) via UI module 88 of the resource access application 86, which is then sent to the preliminary authentication module 62 of the lock-based authentication application 34 of the authentication server 32 across network 36. In some of these embodiments, after a successful preliminary login procedure 106, operation proceeds directly with step 118, while in others, operation proceeds with steps 108-116. In other embodiments, preliminary login procedure 106 is skipped entirely.

If the preliminary login procedure 106 is successful (step 108), then, in step 110, step-up determination module 64 sends certain information about the preliminary login procedure 106 to the risk engine 48 for analysis. This information may include, for example, the location and/or IP address from which the user 42 logged in, the speed at which the user 42 responded to the login inquiry, the time at which the preliminary login procedure 106 occurred, whether there were any failed login attempts prior to the successful login, etc. If, however, the preliminary login procedure 106 fails, then the authentication request 104 is denied, and the user 42 is not permitted to access the protected resource 38.

When the risk engine 48 receives the information from step 110, it analyzes (step 112) the received information in conjunction with other information that risk engine stores about the user 42 and previous login attempts. This analysis 112 may be performed according to the Adaptive Authentication technique utilized by the EMC Corp. of Hopkinton, Mass. The analysis 112 yields a risk score 114, which is sent back to the step-up determination module 64 of the authentication server 32. Then, in step 116, if the risk score 114 exceeds a threshold value for high-risk transactions (the threshold being pre-selected), operation proceeds with step 118. Otherwise, the transaction is not considered risky, and operation may proceed with step 138, in which access is granted immediately.

In step 118, enrollment verification module 65 sends a temporarily-valid validation token 66 to the resource access application 86 of the requesting device 40 to be stored locally as token 90. Then, in step 120, enrollment verification module 65 requests the return of the token from the resource access application 86 of the enrolled device 44. If the enrolled device 44 does not run a resource access application 86 or if it does not store any token 90, then, this request will fail, resulting in the authentication request 104 being denied. Otherwise, in step 122, the resource access application 86 of the enrolled device 44 returns the token 90 to the enrollment verification module 65 to be stored as test token 67. Then, in step 124, enrollment verification module 65 compares the validation token 66 to the test token 67, and, if the comparison succeeds, then operation proceeds with step 126, the requesting device 40 having been verified to be one and the same as the enrolled device 44. If however, the comparison does not succeed (i.e., the resource access application 86 of the enrolled device 44 returned a different token as the test token 67 than was sent to the resource access application 86 of the enrolled device 40 as the validation token 66), then the authentication request 104 is denied.

In step 126, remote locking module 68 sends a lock command over network 36 to the OS 82 of the requesting device 40 (which is now known to be the same as the enrolled device 44). This may be done, for example by remotely invoking the lockNow( ) function of the DevicePolicyManager in Android or by invoking the UIAccessibilityRequestGuidedAccessSession function in iOS. In response, the OS 82 locks the requesting device 40 (step 128). Upon the user 42 unlocking the requesting device 42 (step 130) within a specified timeout period or within a specified number of attempts, resource access application 86 detects an unlock event 132 and again returns the token 90 to the authentication server 32 (step 134). In step 136, remote locking module 68 confirms that the requesting device 40 has been unlocked within the specified timeout period or within the specified number of attempts by confirming that the appropriate validation token 66 has been received within the appropriate amount of time, after which operation proceeds with step 138, in which the access module 70 grants access to the requesting device 40. Otherwise, the authentication request 104 is denied.

Finally, once access is granted, the resource access application 86 is able to access 140 the protected resource 38 across network 36.

Figure 5:
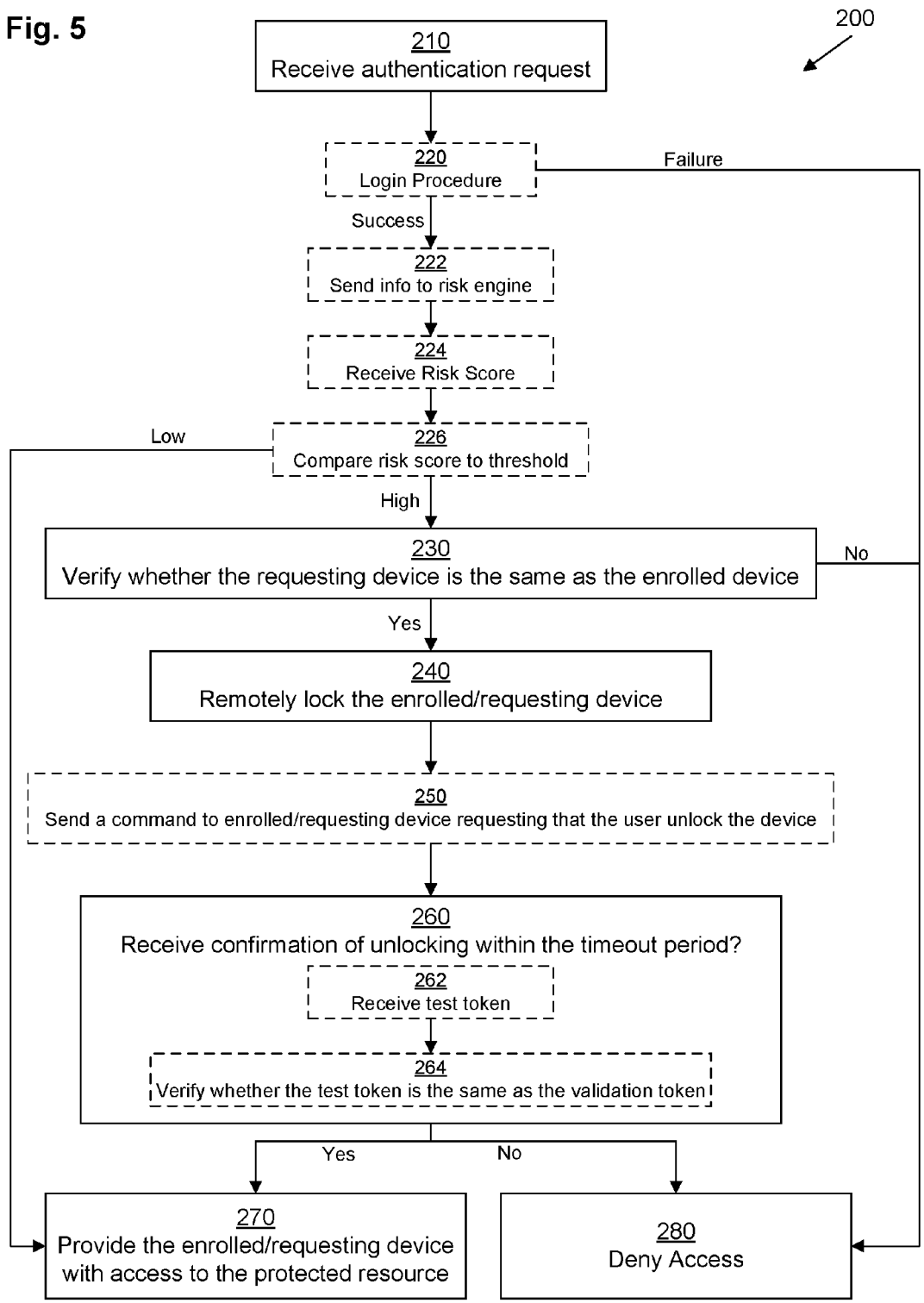
FIG. 5 is a flowchart depicting an example method according to various embodiments.

FIG. 5 depicts an example method 200 according to various embodiments performed by lock-based authentication application 34 of authentication server 32 for deciding whether or not to grant requesting mobile computing device 40 with access to protected resource 38. It should be understood that, within FIG. 5, steps 220-226 and 250 and sub-steps 262-264 are dashed because they may be ancillary or optional to method 200. It should be understood that, within FIG. 5, sub-steps 262-264 are dashed because they represent particular example implementations of step 260, although other implementations may be used instead.

In step 210, lock-based authentication application 34 receives authentication request 104 from requesting device 40 over network 36. In some embodiments, operation proceeds directly with step 230, while in others, a preliminary login procedure 106 is performed first, in which case operation proceeds with optional step 220.

In optional step 220, preliminary authentication module 62 engages in preliminary login procedure 106 with the user 42 over the network 36. This allows the user 42 to supply his username and password to be verified by the authentication server 32. If the preliminary login procedure 106 fails, then operation proceeds with step 280, denying access to the protected resource 38. If it succeeds, however, in some embodiments, operation proceeds directly to step 230, while in other embodiments, operation proceeds with optional step 222.

In optional step 222, step-up determination module 64 sends information about the preliminary login procedure 106 to the risk engine 48 (see above at step 110). Subsequently, once the risk engine calculates (step 112) the risk score 114, in optional step 224, the step-up determination module 64 receives the risk score 114. Then, in optional step 226, the step-up determination module 64 compares the risk score 114 to a pre-set threshold. The threshold is selected in advance, typically by a system administrator, to reflect a maximum acceptable risk for transactions to proceeds without step-up authentication according to various embodiments. If the risk score 114 is lower than the threshold (or in certain embodiments, less than or equal to the threshold), then operation may proceed directly with step 270 in which access to the protected resource 38 is immediately granted. However, if risk score 114 is higher than the threshold (or in certain embodiments, greater than or equal to the threshold), then operation may proceed with step 230.

In step 230, enrollment verification module 65 verifies whether the requesting device 40 is the same as the enrolled device 44. There are various ways in which this step may be accomplished. One embodiment is described below in connection with FIG. 6, involving sending temporarily-valid validation token 66 to the requesting device 40, and then verifying that the enrolled device 44 is able to return the same token. Another embodiment may include sending temporarily-valid validation token 66 to the enrolled device 44, and then verifying that the requesting device 40 is able to return the same token. If the verification fails, operation proceeds with step 280, denying access to the protected resource 38. If it succeeds, however, operation proceeds with step 240.

In step 240, remote locking module 68 remotely locks the requesting device 40 (which is also known to be the enrolled device 44 since step 230) as described above in connection with step 126. In some embodiments, in optional step 250, remote locking module 68 also sends a command to the requesting device 40 requesting that the user 42 unlock the device 40. This command may be displayed on the screen 78 of the device 40.

In step 260, the remote locking module 68 ascertains whether or not it has received confirmation that the requesting device 40 has been unlocked within a timeout period or within a certain number of attempts. This may be accomplished by performing sub-steps 262 and 264. In sub-step 262, remote locking module 68 receives a test token 67 from the resource access application 86 of the requesting device 40. Then, in sub-step 264, remote locking module 68 verifies whether or not the received test token 67 is the same as the validation token 65 that it previously generated and sent to the requesting device 40. If step 260 (sub-step 264) is affirmative, then operation proceeds with step 270 in which access to the protected resource 38 is immediately granted. If, however, step 260 (sub-step 264) is negative, then operation proceeds with step 280, denying access to the protected resource 38.

Figure 6:
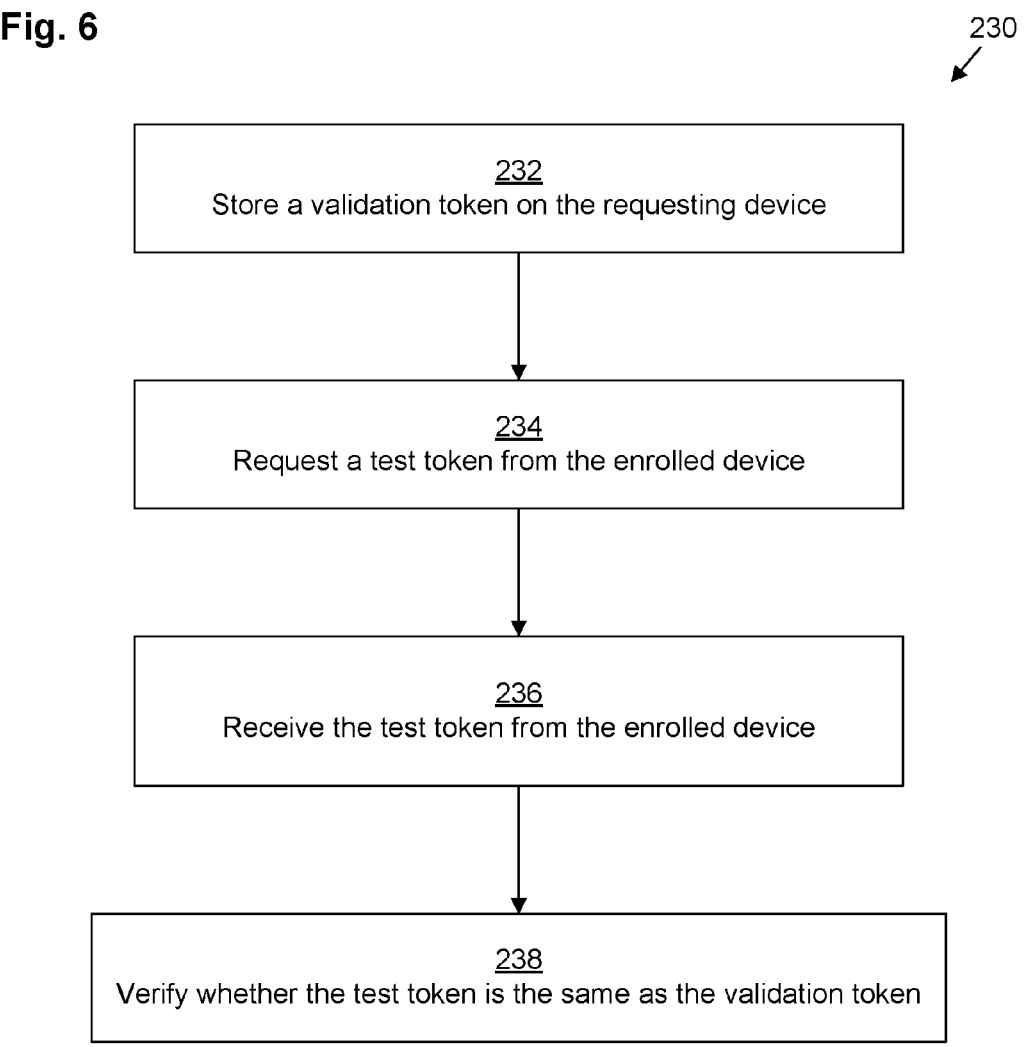
FIG. 6 is a flowchart depicting further detail of an example method according to various embodiments.

Further detail with respect to a particular embodiment of step 230 is depicted in FIG. 6. First, in sub-step 232, enrollment verification module 65 creates and sends temporarily-valid validation token 66 to the resource access application 86 of the requesting device 40 (see step 118 of FIG. 4). Then, in sub-step 234, enrollment verification module 65 requests a test token 67 from the enrolled device 44 (see step 120 of FIG. 4). Then, in sub-step 236, enrollment verification module 65 receives the test token 67 from the enrolled device 44 (see step 122 of FIG. 4), unless the enrolled device 44 does not have any token 90 available to send (in which case, step 230 fails). Finally, in step 238, enrollment verification module 65 verifies whether or not the received test token 67 is the same as the validation token 65 previously sent in sub-step 232.

Thus, embodiments have been described for providing a requesting mobile device 40 with access to a protected resource 38 across a network 36 that do not rely solely on sending something the user 42 knows. An authentication server 32 remotely locks a mobile device 40/44 that is registered to a particular user 42/46 and only permits access once that device 40/44 is unlocked by the user 42/46. Even if an attacker finds or steals the user's enrolled device 44, and even if the enrolled device 44 has been found in an unlocked state, the attacker will not be able to unlock the device 44 once it is remotely locked, thereby preventing access.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method performed by an authentication server device of providing access to a protected resource, the method comprising:
  receiving, by the authentication server device, an authentication request from a requesting device in the name of a particular user, the requesting device being a mobile computing device seeking access to the protected resource in the name of the particular user;
  in response to receiving the authentication request, verifying that the requesting device is an enrolled device, the enrolled device being a mobile computing device previously assigned to the particular user;
  in response to verifying that the requesting device is the enrolled device, remotely locking, by the authentication server device, the enrolled device;
  receiving confirmation, by the authentication server device, that the enrolled device has been unlocked within a timeout period; and
  in response to the authentication server device receiving confirmation that the enrolled device has been unlocked within the timeout period, providing the requesting device with access to the protected resource.

2. The method of claim 1 wherein:
the method further comprises sending a validation token from the authentication server device to the requesting device in response to receiving the authentication request; and
receiving confirmation that the enrolled device has been unlocked includes:
receiving, at the authentication server device, a test token from the enrolled device in response to the enrolled device having been unlocked by the particular user in response to the authentication server device remotely locking the enrolled device; and
verifying that the received test token is equivalent to the validation token.

3. The method of claim 1 wherein:
the method further comprises, in response to receiving the authentication request:
performing, by the authentication server device, a password-based login procedure;
upon successfully performing the password-based login procedure, sending, by the authentication server device, information associated with the password-based login procedure to a risk analysis engine; and
in response, receiving, by the authentication server device from the risk analysis engine, a risk score associated with the password-based login procedure; and
verifying that the requesting device is the enrolled device is performed by the authentication server device in response to receiving the risk score from the risk analysis engine, the risk score being above a threshold value.

4. The method of claim 1 wherein verifying that the requesting device is the enrolled device includes:
sending a validation token from the authentication server device to the requesting device;
requesting, by the authentication server device, that the enrolled device send back the validation token;
in response, receiving, by the authentication server device, a test token from the enrolled device; and
verifying that the received test token is equivalent to the validation token.

5. The method of claim 4 wherein receiving confirmation that the enrolled device has been unlocked includes:
receiving, at the authentication server device, another test token from the enrolled device in response to the enrolled device having been unlocked by the particular user in response to the authentication server device remotely locking the enrolled device; and
verifying that the received other test token is equivalent to the validation token.

6. The method of claim 1 wherein the method further comprises, in response to remotely locking the enrolled device, sending a command from the authentication server device to the enrolled device requesting that the particular user unlock the enrolled device.

7. The method of claim 1 wherein the method further comprises, prior to receiving the authentication request:
receiving an enrollment command from the particular user, the enrollment command identifying the enrolled device; and
in response, assigning the enrolled device to the particular user using a database.

8. A computer program product comprising a non-transitory computer-readable medium storing a set of instructions, which, when executed by a computing device cause the computing device to:
receive an authentication request from a requesting device in the name of a particular user, the requesting device being a mobile computing device seeking access to a protected resource in the name of the particular user;
in response to receiving the authentication request, verify that the requesting device is an enrolled device, the enrolled device being a mobile computing device previously assigned to the particular user;
in response to verifying that the requesting device is the enrolled device, remotely lock the enrolled device;
receive confirmation that the enrolled device has been unlocked within a timeout period; and
in response to receiving confirmation that the enrolled device has been unlocked within the timeout period, provide the requesting device with access to the protected resource.

9. The computer program product of claim 8 wherein:
the set of instructions, when executed by the computing device, further cause the computing device to send a validation token from the authentication server device to the requesting device in response to receiving the authentication request; and
receiving confirmation that the enrolled device has been unlocked includes:
receiving a test token from the enrolled device in response to the enrolled device having been unlocked by the particular user in response to the computing device remotely locking the enrolled device; and
verifying that the received test token is equivalent to the validation token.

10. The computer program product of claim 8 wherein:
the set of instructions, when executed by the computing device, further cause the computing device to, in response to receiving the authentication request:
perform a password-based login procedure;
upon successfully performing the password-based login procedure, send information associated with the password-based login procedure to a risk analysis engine; and
in response, receive from the risk analysis engine, a risk score associated with the password-based login procedure; and
the set of instructions, when executed by the computing device, cause the computing device to verify that the requesting device is the enrolled device in response to receiving the risk score from the risk analysis engine, the risk score being above a threshold value.

11. The computer program product of claim 8 wherein verifying that the requesting device is the enrolled device includes:
sending a validation token to the requesting device;
requesting that the enrolled device send back the validation token;
in response, receiving a test token from the enrolled device; and
verifying that the received test token is equivalent to the validation token.

12. The computer program product of claim 11 wherein receiving confirmation that the enrolled device has been unlocked includes:
receiving another test token from the enrolled device in response to the enrolled device having been unlocked by the particular user in response to the computing device remotely locking the enrolled device; and verifying that the received other test token is equivalent to the validation token.

13. The computer program product of claim 8 wherein the set of instructions, when executed by the computing device, further cause the computing device to, in response to remotely locking the enrolled device, send a command to the enrolled device requesting that the particular user unlock the enrolled device.

14. The computer program product of claim 8 wherein the set of instructions, when executed by the computing device, further cause the computing device to, prior to receiving the authentication request:

receive an enrollment command from the particular user, the enrollment command identifying the enrolled device; and in response, assign the enrolled device to the particular user using a database.

15. An apparatus comprising:

network interface circuitry for connecting to a network;

memory; and processing circuitry coupled to the memory, the processing circuitry being configured to:

receive, via the network interface circuitry, an authentication request from a requesting device on the network in the name of a particular user, the requesting device being a mobile computing device seeking access to a protected resource in the name of the particular user;

in response to receiving the authentication request, verify that the requesting device is an enrolled device, the enrolled device being a mobile computing device previously assigned to the particular user;

in response to verifying that the requesting device is the enrolled device, remotely lock the enrolled device via the network interface circuitry;

receive confirmation, via the network interface circuitry, that the enrolled device has been unlocked within a timeout period; and in response to receiving confirmation that the enrolled device has been unlocked within the timeout period, provide the requesting device with access to the protected resource.

* * * * *